United States Patent
Sarkar et al.

(10) Patent No.: US 10,384,948 B2
(45) Date of Patent: Aug. 20, 2019

(54) CRACKING CATALYST COMPOSITION FOR CRACKING OF HEAVY HYDROCARBON FEED STOCKS AND PROCESS FOR PREPARING THE SAME

(71) Applicant: INDIAN OIL CORPORATION LIMITED, Mumbai (IN)

(72) Inventors: Biswanath Sarkar, Faridabad (IN); Mohan Prabhu Kuvettu, Faridabad (IN); Velusamy Chidambaram, Faridabad (IN); Alex Cheru Pulikottil, Faridabad (IN); Pankaj Kumar Kasliwal, Faridabad (IN); Shiba Prasad Choudhury, Faridabad (IN); Ram Mohan Thakur, Faridabad (IN); Brijesh Kumar, Faridabad (IN); Biswapriya Das, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 169 days.

(21) Appl. No.: 15/232,685

(22) Filed: Aug. 9, 2016

(65) Prior Publication Data
US 2017/0144140 A1    May 25, 2017

(30) Foreign Application Priority Data

Nov. 20, 2015   (IN) .......................... 4375/MUM/2015

(51) Int. Cl.
| | | |
|---|---|---|
| B01J 29/06 | (2006.01) | |
| C01B 39/02 | (2006.01) | |
| B01J 37/00 | (2006.01) | |
| C01B 39/24 | (2006.01) | |
| B01J 29/08 | (2006.01) | |
| B01J 35/00 | (2006.01) | |
| B01J 35/02 | (2006.01) | |
| B01J 37/28 | (2006.01) | |
| B01J 29/18 | (2006.01) | |
| B01J 29/40 | (2006.01) | |
| B01J 29/70 | (2006.01) | |
| B01J 35/08 | (2006.01) | |

(52) U.S. Cl.
CPC ............. *C01B 39/026* (2013.01); *B01J 29/08* (2013.01); *B01J 29/084* (2013.01); *B01J 29/18* (2013.01); *B01J 29/40* (2013.01); *B01J 29/7007* (2013.01); *B01J 35/0006* (2013.01); *B01J 35/023* (2013.01); *B01J 35/08* (2013.01); *B01J 37/0036* (2013.01); *B01J 37/0045* (2013.01); *B01J 37/28* (2013.01); *C01B 39/24* (2013.01); *B01J 2229/18* (2013.01); *B01J 2229/186* (2013.01); *B01J 2229/20* (2013.01); *B01J 2229/36* (2013.01); *B01J 2229/42* (2013.01)

(58) Field of Classification Search
CPC . B01J 29/08; B01J 29/084; B01J 29/18; B01J 29/40; B01J 29/7007; B01J 35/08; B01J 35/023; B01J 35/0006; B01J 37/0045; B01J 37/0036; B01J 37/28; B01J 2229/20; B01J 2229/36; B01J 2229/42; B01J 2229/186
USPC ..... 502/60, 63, 64, 68, 69, 71, 77, 78, 79, 8
See application file for complete search history.

(56) References Cited

U.S. PATENT DOCUMENTS

| | | | |
|---|---|---|---|
| 4,576,709 A | 3/1986 | Miller et al. | |
| 5,958,818 A * | 9/1999 | Demmel | B01J 21/16 502/208 |
| 6,114,267 A | 9/2000 | Ghosh et al. | |
| 6,528,447 B1 | 3/2003 | Ghosh et al. | |
| 7,517,827 B2 * | 4/2009 | Ravichandran | B01J 29/06 502/63 |
| 2013/0078468 A1 * | 3/2013 | Kuvettu | B01J 23/10 428/402 |
| 2013/0261355 A1 * | 10/2013 | Stamires | B01J 29/82 585/240 |
| 2014/0007493 A1 * | 1/2014 | Henry | B01J 29/40 44/307 |
| 2016/0017238 A1 * | 1/2016 | Stamires | B01J 29/084 585/469 |
| 2016/0216242 A1 * | 7/2016 | Ravichandran | B01J 29/40 |

FOREIGN PATENT DOCUMENTS

WO      1997/012011 A1    9/1996

* cited by examiner

*Primary Examiner* — Elizabeth D Wood
(74) *Attorney, Agent, or Firm* — Maschoff Brennan

(57) ABSTRACT

The present invention relates to a Cracking Catalyst composition for cracking of heavy hydrocarbon feed stocks and process for preparing the catalyst. The catalyst is prepared by incorporating 1-10 wt % phosphate treated USY zeolite in which phosphate is present in the range of 10 to 50 wt % on the basis of phosphated zeolite, in a mixture of 10-50 wt % dispersible alumina, 0-30 wt % non-dispersal alumina, 5-30 wt % colloidal silica, 15-50 wt % clay and 5-15 wt % phosphate.

7 Claims, No Drawings

CRACKING CATALYST COMPOSITION FOR CRACKING OF HEAVY HYDROCARBON FEED STOCKS AND PROCESS FOR PREPARING THE SAME

FIELD OF THE INVENTION

The present invention relates to a catalyst composition & a process suitable for up-gradation of residues. In particular, the present invention relates to a catalyst additive suitable for up-gradation of heavier hydrocarbons to gasoline with reduction in dry gas & coke in Fluid Catalytic Cracking (FCC) Process.

BACKGROUND OF THE INVENTION

It is well accepted fact that the crude oils available to refineries are becoming heavier. Meanwhile, the demand for high value products such as gasoline and middle distillates is increasing. The trend towards heavy feedstock and urgent demand for high quality products coupled with tightening fuel regulations are presenting new challenges for refineries. Among the commercially available options, Fluid Catalytic Cracking (FCC) process is one of the key workhorses for conversion of heavy oils into high-value products.

Designing of FCC catalyst for processing heavy crudes is the key challenges to a catalyst developer for achieving these targets. The current generation FCC catalysts used in cracking process for heavy oils are among the most sophisticated engineered catalysts, having high selectivity towards gasoline range products due to the presence of customized faujasite type zeolites having high acidity, higher hydrothermal stability and discrete pores in the range 6.5 Å to 13.5 Å. Heavy feeds contain high carbon residue, nitrogen, aromatics and contaminants such as nickel, vanadium and other contaminant metals. Processing such feeds while meeting changing product slate, demand catalysts having higher metal tolerance, mesoporous active matrix and small pore zeolite. In a word, the catalyst activity, selectivity, particle size and shape, pore size and distribution, have to be optimized according to the properties of the heavy oils. Further, it is also very difficult to optimize all the said properties within FCC catalyst as this approach can adversely affect the performance of main catalyst. To overcome the above limitations use of additives as separate particles is in practice by the refiner to meet their specific objectives. There are several additive technologies available in the FCC market to obtain yields which meet refinery objectives.

The ability of the feed molecules to reach the active sites of the catalyst is important and for heavy resid molecules, mass transport limitations play an important role. In order to handle the challenges associated with cracking of resid molecules, it is essential to optimize the pore architecture and generation and distribution of weak acid sites in additive formulations.

WO1997012011A1 relates to a process and product for bottom cracking, comprising of aluminosilicate, acid dispersible alumina, phosphate containing ingredient/non-dispersible alumina and $C_2$-$C_{20}$ alkoxide hydrolysed with water and purified by ion exchange with silicic acid compound.

Cracking catalysts introduced in late nineties are based on dispersible alumina and rare earth exchanged Y zeolites do possess improved hydrothermal stability and higher diesel selectivity (U.S. Pat. Nos. 6,528,447, 6,114,267). However, as the zeolitic material is part of catalyst microsphere, major cracking activity is contributed by these zeolites and as a virtue of higher acid strength, these crack hydrocarbons majorly to gasoline range molecules and partly to LPG range. However, part of heavy hydrocarbon cracking to the boiling range of LCO and heavy naphtha is partly met through use of alumina, silica-alumina matrix or by use of additive referred under WO 97/12011.

U.S. Pat. No. 4,576,709 concerned with upgrading residual oils to gasoline product with a coke selective hydrogen stable faujasite crystalline zeolite catalyst comprising at least 40 weight percent of alumina and rare earth metals. This patent does not disclose use of acid treated fujasite zeolite for bottom up-gradation.

Further, number of patents in the prior art disclose the concept of passivating metal contaminants of nickel, vanadium, copper and iron by the addition of metals and compounds thereof selected from the group of magnesium, calcium, strontium, barium, scandium, titanium, chromium, molybdenum, manganese, cobalt, antimony, zinc, cadmium, zirconium, tin, lead and rare earth metals, all of which may or may not contribute to altering product selectivity in a fluid catalytic cracking operation.

SUMMARY OF THE INVENTION

The above prior arts disclose use of silica alumina matrix in combination with zeolite and different metal passivating components to crack petroleum feed stock. The entire prior art possess creation of acid sites employing directly bronstead/Lewis acid sites present on zeolite, phosphate, alumina, silica-alumina. It may be appreciated that, the cracking of heavier hydrocarbons demands tailored acid sites having weak acid strength which can be easily accessed through tailored pore diameter matrix/binder.

In the present invention, these two parameters were addressed efficiently. The invention discloses preparation of support material by creation of secondary pore in the range of 20° A to 200° A by removing part of Si—Al framework in USY zeolite. Further strong acid sites present on support material have been modified to weak acid sites by reacting with calculated amount of phosphate source selected from phosphoric acid, mono-ammonium hydrogen phosphate, di-ammonium hydrogen phosphate. Thus prepared large pore USY zeolite having large number of weak acid sites is bonded by clay-phosphate, aluminium phosphate, colloidal silica and clay as diluents to produce the final catalyst composition. The subject catalyst can be in the shape of extrude, pallet, tablet, ring or in the shape of fine microsphere with particle size ranging from 20 to 200 micron for Fluid Catalytic Cracking application.

Thus the present invention is directed to a new and novel combination of catalyst composition which can help refiner to upgrade heavier hydrocarbons selectively to gasoline with reduction in dry gas, coke in FCC Process. For the subject invention, besides pore modified faujasite type zeolite, other zeolite such as, mordenite, beta, ZSM-5, ZSM-11 with silica-alumina ratio ranging from 10 to 100 can also be used as per requirement.

OBJECTIVE OF THE INVENTION

An object of this invention is to propose a suitable catalyst composition for cracking of heavy hydrocarbon feed stocks.

Another object of this invention is to propose a process for the preparation of a catalyst product for cracking of heavy hydrocarbon feed stocks.

Further object of present invention is to crack heavier hydrocarbons molecules to produce mainly diesel and gasoline range products with up-gradation of bottoms with simultaneous reduction in coke and dry gas.

Still another object of this invention is to prepare a catalyst composition with high density (0.80-0.90 gm/cc and low attrition index (<5) to ensure longer stay of the catalyst in the cracking unit.

DESCRIPTION OF THE INVENTION

It will be appreciated that several of the details set forth below are provided to describe the following embodiments in a manner sufficient to enable a person skilled in the relevant art to make and use the disclosed embodiments. Several of the details described below, however, may not be necessary to practice certain embodiments of the invention. Additionally, the invention can include other embodiments that are within the scope of the claims but are not described in detail with respect to the following description.

While the invention is susceptible to various modifications and/or alternative processes and/or compositions, specific embodiment thereof has been shown by way of example in tables and will be described in detail below. It should be understood, however that it is not intended to limit the invention to the particular processes and/or compositions disclosed, but on the contrary, the invention is to cover all modifications, equivalents, and alternative falling within the spirit and the scope of the invention as defined by the appended claims.

The tables and protocols have been represented where appropriate by conventional representations, showing only those specific details that are pertinent to understanding the embodiments of the present invention so as not to obscure the disclosure with details that will be readily apparent to those of ordinary skill in the art having benefit of the description herein.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

According to the main embodiment, the present invention comprises of composition and process for cracking catalyst. The subject catalyst composition comprises of 1-10 wt % phosphate treated zeolite, 10-50 wt % dispersible alumina, 0-30% non-dispersible alumina, 5-30 wt % colloidal silica, 15-50 wt % clay and 5-15 wt % phosphate, suitable for use in the range 1 to 20 wt % along with FCC catalyst for up-gradation of bottom selectively to middle distillate products.

In an embodiment of the present invention, the zeolite employed is selected from the group comprising of faujasite, mordenite, beta, ZSM-5, ZSM-11, and the zeolite has silica-alumina ratio ranging from 10 to 100.

In an embodiment of the present invention, the secondary large pore on USY zeolite was created by hydrothermal treatment.

According to the embodiments of the invention the particle size of zeolite product is reduced to below 1 micron under controlled condition through milling for creation of large external surface area.

In an embodiment of the present invention, zeolite is treated with phosphate ranging from 2 wt % to 55 wt % to create weak acid sites.

According to the embodiments of the invention, the phosphates which are being treated with zeolite are selected from the source comprising of phosphoric acid, mono-ammonium hydrogen phosphate and di-ammonium hydrogen phosphate.

In an embodiment of the present invention, the dispersible alumina selected from the group comprising of pseudo boehmite, Catapal B, Pural 200, Disperal 40, Pural 400 and the non-dispersible alumina selected from the from the group comprising of alumina trihydrate, gamma alumina.

In an embodiment of the present invention, the binders are selected from the group comprising of aluminium phosphate, colloidal silica, alumina and silica-alumina.

In an embodiment of the present invention, the phosphate treated zeolite is used in the range of 1-10 wt %.

In an embodiment of the present invention, the colloidal silica used is in the range of 5 to 25 wt % and most preferable range is 15-20 wt % and colloidal silica used would be sodium or ammonium stabilized, which has residual soda lower than 0.3 wt %, ammonia lower than 0.3 wt % and silica content ranging from 20-45 wt %, particle size from 10-400 nm.

According to the embodiment of the invention, the present invention covers the process for the preparation of cracking catalyst comprising the steps:
 (i) creation of large pore zeolite by hydrothermal treatment;
 (ii) milling of zeolite to reduce the particle size to below 1 micron;
 (iii) treating milled zeolite with a source of phosphate, and ageing for 3 hrs;
 (iv) gelling of alumina employing mineral or organic acid;
 (v) preparing of clay-phosphate slurry;
 (vi) adding of clay phosphate slurry of step (v) to gel alumina of step (iv);
 (vii) adding of colloidal silica to product of step (vi);
 (viii) adding of phosphate treated milled zeolite of step (iii) to product of step (vii);
 (ix) spray drying the product of step (viii) to obtain catalyst microspheres with particle size ranging from 20 to 200 micron;
 (x) calcining the microspheres of step (ix) to obtain ready to use additive for cracking of heavy hydro-carbon molecules to produce predominantly gasoline and diesel range products.

In the present invention two parameters were addressed efficiently. Invention discloses preparation of support material by creation of secondary pore in the range of 20° A to 200° A by removing part of Si—Al framework in USY zeolite through hydrothermal treatment. Further strong acid sites present on zeolite material have been modified to weak acid sites, by reacting with calculated amount of phosphate source selected from phosphoric acid, mono-ammonium hydrogen phosphate, di-ammonium hydrogen phosphate. Thus prepared large pore USY zeolite having large number of weak acid sites is bonded with clay-phosphate, aluminium phosphate, colloidal silica and clay as diluents and to prepare the final catalyst. The subject catalyst can be in the shape of extrude, pallet, tablet, ring or in the shape of fine micro-sphere with particle size ranging from 20 to 200 micron for Fluid Catalytic Cracking application.

Use of such zeolite material is effective in cracking of heavy hydrocarbon molecule as it has large number of similar type of weak acid site than normal silica-alumina mesoporous materials. Further, due to having secondary large pores in the range of 20° A to 200° A, all the weak sites are equally effective for accessing higher hydrocarbon molecules which in turn enhances the catalytic activity to crack heavy hydro carbon molecules mainly to diesel and gasoline range products.

Example-1: Creation of Secondary Large Pore and Weak Acid Sites on USY Zeolite A. Creation of Large Pore USY Zeolite The secondary large pore on USY zeolite was created by hydrothermal treatment. In a reactor, 60 gm of USY zeolite was taken having pore diameter in the range of 6.5 Å to 13.5 Å and heated it to 400-450° C. under nitrogen atmosphere. When the temperature reached to 400-450° C., water was injected in the reactor at a flow rate of 5-6 ml/hr for 3 hrs to remove some of the frame work Si-Alumina to generate secondary pores. USY zeolite was removed from the reactor after cool down to ambient temperature. The USY zeolite obtained after hydrothermal treatment has secondary pore in the range of 20 Å to 200 Å.

B. Preparation of Phosphated USY Zeolite 606.80 gm of phosphoric acid (85%) solution was added in 733.33 gm of DM water to form dilute phosphoric acid solution. Gradually added 666.67 gm of USY zeolite (LOI=25 wt %) as prepared under step A to dilute phosphoric acid solution and milled for three hours to form phosphated USY zeolite.

Example-2: Additive Prepared with 10 wt % Phosphate Treated USY Zeolite as Per Present Invention 2.1 Preparation of clay-alumina slurry: 324.32 gm of Pural SB grade alumina (LOI: 26 wt %), 257.58 gm of aluminium tri-hydrate (LOI: 34 wt %), and 235.29 gm (LOI: 15 wt %) of clay were dispersed in 915 gm of DM water under stirring and milled for 3 hrs. 15.97 gm of formic acid (85 wt %) was diluted with 40 gm of DM water and was added to clay-alumina water mixture under stirring. Mixture was kept for 30 minutes to form clay-alumina binder.

2.2 Preparation of clay-alumina-silica-phosphate slurry: 666.67 gm of ammonium poly-silicate ($SiO_2$=30 wt %) was added under stirring to clay-alumina slurry prepared under 2.1 and then added phosphate solution, which was prepared by dissolving 125.12 gm of di-ammonium hydrogen phosphate in 190 gm of DM water, to form clay-alumina-silica-phosphate slurry.

2.3 Preparation of final catalyst precursor slurry: 200.68 gm of phosphated USY zeolite as prepared under Example-1 was added under vigorous starring to clay-alumina-silica-phosphate slurry prepared under 2.2 to form final catalyst precursor slurry.

2.4 Spray drying: Catalyst precursor slurry obtained under step 2.3 was spray dried with spray drier inlet temperature 360° C., out let temperature 125° C. and feed pressure of 2-4 kg/cm².

2.5 The spray dried product obtained under step 2.4 was calcined in the furnace at a temperature of 550° C. for 1 hr to produce the final catalyst additive product.

Example-3: Additive Prepared with 5 wt % Phosphate Treated USY Zeolite as Per Present Invention 3.1 Preparation of clay-alumina slurry: 324.32 gm of Pural SB grade alumina (LOI: 26 wt %), 257.58 gm of aluminium tri-hydrate (LOI: 34 wt %), and 294.12 gm (LOI: 15 wt %) of clay were dispersed in 990 gm of DM water under stirring and milled for 3 hrs. 15.97 gm of formic acid (85 wt %) was diluted with 40 gm of DM water and was added to clay-alumina water mixture under stirring. Mixture was kept for 30 minutes to form clay-alumina binder.

3.2 Preparation of clay-alumina-silica-phosphate slurry: 666.67 gm of ammonium poly-silicate (SiO2=30 wt %) was added under stirring to clay-alumina slurry prepared under 3.1 and then added phosphate solution, which was prepared by dissolving 125.12 gm of di-ammonium hydrogen phosphate in 190 gm of DM water, to form clay-alumina-silica-phosphate slurry.

3.3 Preparation of final catalyst precursor slurry: 100.34 gm of phosphated USY zeolite as prepared under Example-1 was added under vigorous starring to clay-alumina-silica-phosphate slurry prepared under 3.2 to form final catalyst precursor slurry.

3.4 Spray drying: Catalyst precursor slurry obtained under step 3.3 was spray dried with spray drier inlet temperature 360° C., out let temperature 125° C. and feed pressure of 2-4 kg/cm².

3.5 The spray dried product obtained under step 3.4 was calcined in the furnace at a temperature of 550° C. for 1 hr to produce the final catalyst additive product.

Example-4: Additive Prepared with 15 wt % Phosphate Treated USY Zeolite 4.1 Preparation of clay-alumina slurry: 324.32 gm of Pural SB grade alumina (LOI: 26 wt %), 257.58 gm of aluminium tri-hydrate (LOI: 34 wt %), and 176.47 gm (LOI: 15 wt %) of clay were dispersed in 840 gm of DM water under stirring and milled for 3 hrs. 15.97 gm of formic acid (85 wt %) was diluted with 40 gm of DM water and was added to clay-alumina water mixture under stirring. Mixture was kept for 30 minutes to form clay-alumina binder.

4.2 Preparation of clay-alumina-silica-phosphate slurry: 666.67 gm of ammonium poly-silicate ($SiO_2$=30 wt %) was added under stirring to clay-alumina slurry prepared under 4.1 and then added phosphate solution, which was prepared by dissolving 125.12 gm of di-ammonium hydrogen phosphate in 190 gm of DM water, to form clay-alumina-silica-phosphate slurry.

4.3 Preparation of final catalyst precursor slurry: 301.02 gm of phosphated USY zeolite as prepared under Example-1 was added under vigorous starring to clay-alumina-silica-phosphate slurry prepared under 4.2 to form final catalyst precursor slurry.

4.4 Spray drying: Catalyst precursor slurry obtained under step 4.3 was spray dried with spray drier inlet temperature 360° C., out let temperature 125° C. and feed pressure of 2-4 kg/cm².

4.5 The spray dried product obtained under step 4.4 was calcined in the furnace at a temperature of 550° C. for 1 hr to produce the final catalyst additive product.

Example-5: Additive Prepared without Phosphate Treated USY Zeolite 5.1 Preparation of clay-alumina slurry: 324.32 gm of Pural SB grade alumina (LOI: 26 wt %), 257.58 gm of aluminium tri-hydrate (LOI: 34 wt %), and 294.12 gm (LOI: 15 wt %) of clay were dispersed in 990 gm of DM water under stirring and milled for 3 hrs. 15.97 gm of formic acid (85 wt %) was diluted with 40 gm of DM water and was added to clay-alumina water mixture under stirring. Mixture was kept for 30 minutes to form clay-alumina binder.

5.2 Preparation of final slurry: 666.67 gm of ammonium poly-silicate ($SiO_2$=30 wt %) was added under stirring to clay-alumina slurry prepared under 5.1 and then added phosphate solution, which was prepared by dissolving 194.63 gm of di-ammonium hydrogen phosphate in 290 gm of DM water, to form final catalyst precursor slurry.

5.3 Spray drying: Catalyst precursor slurry obtained under step 5.2 was spray dried with spray drier inlet temperature 360° C., out let temperature 125° C. and feed pressure of 2-4 kg/cm².

5.4 The spray dried product obtained under step 5.3 was calcined in the furnace at a temperature of 550° C. for 1 hr to produce the final catalyst additive product.

Properties of feed where all the above additives prepared as per examples 2 to 5 are evaluated are given below in Table-1:

TABLE 1

Feed properties in which performance of catalyst was tested

| Sr. No | Attributes | Unit | Value |
|---|---|---|---|
| 1 | Density @ 15° C. | g/cc | 0.8653 |
| 2 | Kinematic Viscosity @ 60° C. | Cst | 23 |
| 3 | Distillation, D-1160 | | |
| 4 | IBP | ° C. | 270 |
| 5 | 5% | ° C. | 355 |
| 8 | 30% | ° C. | |
| 9 | 50% | ° C. | 460 |
| 10 | 90% | ° C. | 540 |
| 11 | 95% | ° C. | 570 |
| 12 | EP | ° C. | 605 |
| 13 | Sulphur | wt % | 0.57 |
| 14 | Total N2 | ppm | 625 |
| 15 | CCR | wt % | 1.77 |

Performance and physicochemical properties of residue up-gradation additive prepared by the above Examples-2 to 5

TABLE 2

Performance results along with physical properties and additive composition

| | Base yields | Ex-2 | Ex-3 | Ex-4 | Ex-5 |
|---|---|---|---|---|---|
| Performance evaluation Yields, wt % | | | | | |
| Conversion | 72.65 | 72.65 | 72.65 | 72.65 | 72.65 |
| Coke | 5.6 | 5.52 | 5.42 | 6.28 | 6.86 |
| DG | 3.92 | 3.69 | 3.72 | 4.19 | 4.24 |
| LPG | 31.26 | 30.80 | 30.89 | 30.90 | 30.94 |
| Gasoline (C5-190° C.) | 31.47 | 32.73 | 32.62 | 31.28 | 30.61 |
| TCO (190° C.-370° C.) | 16.07 | 16.45 | 16.49 | 15.97 | 15.58 |
| Bottom (370+) | 11.68 | 10.81 | 10.86 | 11.38 | 11.77 |
| Total | | 100.00 | 100.00 | 100.00 | 100.00 |
| Physical properties | | | | | |
| ABD, gm/cc | | 0.80 | 0.79 | 0.78 | 0.82 |
| Attrition Index | | 4.2 | 5.1 | 5.8 | 5.5 |
| Composition, wt % | | | | | |
| PSB alumina | | 24 | 24 | 24 | 24 |
| Aluminium tri hydrate | | 17 | 17 | 17 | 17 |
| $SiO_2$ | | 20 | 20 | 20 | 20 |
| di-ammonium hydrogen phosphate as PO4 | | 9 | 9 | 9 | 14 |
| Phosphated USY zeolite | | 10 | 5 | 15 | 0 |
| Clay | | 20 | 25 | 15 | 25 |
| Total | | 100 | 100 | 100 | 100 |

The examples 2 & 3 were prepared based on the present invention. The performance results indicate lower bottom yields, lower coke yields and higher gasoline yields w.r.to to the catalyst prepared under Example-4 and Example-5.

We claim:

1. A process for the preparation of a catalyst additive comprising the steps of:
   i. hydrothermal treating of a zeolite to generate a secondary set of pores in the zeolite, wherein the secondary pores are in the range of 20 Å to 200 Å;
   ii. milling of the zeolite to reduce the particle size to below 1 micron to obtain a milled zeolite;
   iii. treating of the milled zeolite with a source of a phosphate, and ageing for 3 hrs to obtain a phosphate treated milled zeolite;
   iv. gelling of a dispersible alumina and a non-dispersible alumina together employing a mineral or an organic acid to obtain a gel alumina;
   v. preparing of a clay-phosphate slurry;
   vi. adding of the clay phosphate slurry of step (v) to the gel alumina of step (iv);
   vii. adding of a colloidal silica to product of step (vi);
   viii. adding 1-10 wt % of the phosphate treated milled zeolite of step (iii) to product of step (vii);
   ix. spray drying the product of step (viii) to obtain a catalyst microspheres with particle size ranging from 20 to 200 micron; and
   x. calcining the microspheres of step (ix) to obtain the ready to use additive for cracking of a heavy hydrocarbon molecules to produce predominantly a gasoline and diesel range product,
   wherein step (i) comprises the following steps:
   a) heating the zeolite selected from the group consisting of faujasite, mordenite, beta, ZSM-5, ZSM-11 and USY Zeolite to 400-450° C. in a reactor under nitrogen atmosphere;
   b) passing the water in a reactor at a flow rate of 5-6 ml/hr for 3 hrs to generate secondary pores;
   c) cooling down the zeolite as obtained in step (b) to ambient temperature.

2. The process of the preparation of catalyst of claim 1, wherein the silica alumina ratio of the zeolite of step (c) is in the range of 10-100 & particle size below 1 micron.

3. The process of the preparation of catalyst of step-(ii) of claim 1, wherein the particle size of the zeolite is reduced to below 1 micron by wet milling of the zeolite.

4. The process of the preparation of catalyst of step-(iii) of claim 1, wherein the phosphated zeolite is prepared by reacting milled zeolite of claim 3 with phosphate source from group comprising of phosphoric acid, mono-ammonium hydrogen phosphate and di-ammonium hydrogen phosphate.

5. The process of the preparation of catalyst of step-(iii) of claim 1, wherein the phosphated zeolite contains phosphate ranging from 2 wt % to 55 wt %.

6. The process of the preparation of catalyst of step-(iv) of claim 1, wherein the gel alumina is prepared by reacting dispersible and non-dispersible alumina with a formic acid.

7. The process of the preparation of catalyst of step-(v) of claim 1, where in the clay phosphate slurry is prepared by reacting water slurry of clay with phosphate selected from group comprising of phosphoric acid, mono-ammonium hydrogen phosphate and di-ammonium hydrogen phosphate.

* * * * *